United States Patent
Peng

(10) Patent No.: US 10,341,716 B2
(45) Date of Patent: Jul. 2, 2019

(54) LIVE INTERACTION SYSTEM, INFORMATION SENDING METHOD, INFORMATION RECEIVING METHOD AND APPARATUS

(71) Applicant: TENCENT TECHNOLOGY (SHENZHEN) COMPANY LIMITED, Shenzhen, Guangdong (CN)

(72) Inventor: Ao Peng, Shenzhen (CN)

(73) Assignee: TENCENT TECHNOLOGY (SHENZHEN) COMPANY LIMITED, Shenzhen ( * ) Notice: Subject to any disclaimer, the term of this patent is extended or adjusted under 35 U.S.C. 154(b) by 161 days.

(21) Appl. No.: 15/442,618

(22) Filed: Feb. 24, 2017

(65) Prior Publication Data
US 2017/0171599 A1    Jun. 15, 2017

Related U.S. Application Data

(63) Continuation of application No. PCT/CN2016/078999, filed on Apr. 11, 2016.

(30) Foreign Application Priority Data

May 11, 2015 (CN) .......................... 2015 1 0236336

(51) Int. Cl.
*H04N 21/4725* (2011.01)
*H04N 21/435* (2011.01)
(Continued)

(52) U.S. Cl.
CPC ............ *H04N 21/435* (2013.01); *G06F 3/14* (2013.01); *G06F 3/147* (2013.01); *G06F 17/248* (2013.01);
(Continued)

(58) Field of Classification Search
CPC ... H04N 21/234336; H04N 21/440236; H04N 9/74
See application file for complete search history.

(56) References Cited

U.S. PATENT DOCUMENTS

2002/0163531 A1* 11/2002 Ihara .................... G06F 1/162
715/719
2008/0307307 A1* 12/2008 Ciudad .................. G06T 13/80
715/719
(Continued)

FOREIGN PATENT DOCUMENTS

| CN | 103533460 A | 1/2014 |
|---|---|---|
| CN | 103634681 A | 3/2014 |

(Continued)

OTHER PUBLICATIONS

International Search Report in international application No. PCT/CN2016/078999, dated Jul. 14, 2016.
(Continued)

*Primary Examiner* — Junior O Mendoza
(74) *Attorney, Agent, or Firm* — Syncoda LLC; Feng Ma

(57) ABSTRACT

Disclosed a live interaction system, an information sending method, an information receiving method and device, and belongs to the technical field of Internet. The system includes at least one client and an interaction platform. the client is configured to send to the interaction platform an interaction instruction for instructing the interaction platform to add an interaction prop into a live stream; and the interaction platform is configured to intercept an image frame from the current live stream, generate instant feedback information according to the image frame and the interaction prop indicated by the interaction instruction, and send the instant feedback information to the client.

16 Claims, 13 Drawing Sheets

(51) Int. Cl.
  *G06F 3/14* (2006.01)
  *G06F 17/24* (2006.01)
  *H04L 29/06* (2006.01)
  *H04N 21/4722* (2011.01)
  *H04N 21/81* (2011.01)
  *G06F 3/147* (2006.01)
  *H04N 21/235* (2011.01)
  *H04N 21/475* (2011.01)
  *H04N 21/478* (2011.01)
  *H04N 21/658* (2011.01)

(52) U.S. Cl.
  CPC .......... *H04L 65/602* (2013.01); *H04L 65/605* (2013.01); *H04L 67/38* (2013.01); *H04N 21/235* (2013.01); *H04N 21/478* (2013.01); *H04N 21/4722* (2013.01); *H04N 21/4758* (2013.01); *H04N 21/6581* (2013.01); *H04N 21/8126* (2013.01)

(56) References Cited

U.S. PATENT DOCUMENTS

| | | | | |
|---|---|---|---|---|
| 2009/0063995 A1* | 3/2009 | Baron | ............ | G06Q 10/10 715/753 |
| 2009/0328122 A1* | 12/2009 | Amento | ............ | H04N 7/17318 725/114 |
| 2010/0306655 A1* | 12/2010 | Mattingly | ............ | G06Q 10/10 715/720 |
| 2011/0126252 A1* | 5/2011 | Roberts | ............ | H04N 7/17318 725/114 |
| 2013/0147904 A1* | 6/2013 | Vivekanandan | ......... | H04N 7/15 348/14.08 |
| 2014/0079371 A1* | 3/2014 | Tang | ................. | H04N 21/8586 386/240 |

FOREIGN PATENT DOCUMENTS

| | | |
|---|---|---|
| CN | 103634683 A | 3/2014 |
| CN | 104363519 A | 2/2015 |
| CN | 104918124 A | 9/2015 |
| JP | 2003092706 A | 3/2003 |
| JP | 2003125361 A | 4/2003 |
| JP | 2012120098 A | 6/2012 |

OTHER PUBLICATIONS

Notice of Allowance of Japanese application No. 2017-518518 with English abstract, dated Mar. 12, 2018.

* cited by examiner

LIVE INTERACTION SYSTEM, INFORMATION SENDING METHOD, INFORMATION RECEIVING METHOD AND APPARATUS

CROSS-REFERENCE TO RELATED APPLICATIONS

This is a continuation application of International Patent Application No. PCT/CN2016/078999, filed on Apr. 11, 2016, which claims priority to Patent Application No. 201510236336.2, filed before Chinese Patent Office on May 11, 2015 and entitled "live interaction system, information sending method, information receiving method and equipment", the entire contents of which are incorporated herein by reference.

TECHNICAL FIELD

The disclosure generally relates to the field of Internet technologies, and more particularly, to a live interaction system, an information sending method, an information receiving method and apparatus.

BACKGROUND

Along with development of Internet technologies, a user may watch online live programs and participate in interaction over a network without visiting the site.

For example, when a user watches an online live concert over a network, a live broadcast server sends pictures from the site to a client by live streaming. When watching the live program, the user may use the client to send to the live broadcast server an interaction instruction for displaying corresponding interaction props in the live stream, for example, a virtual flower, a virtual gold coin, a virtual sycee, etc. The live broadcast server adds, according to the received interaction instruction, a corresponding interaction prop into the live stream which is to be sent to the client. Accordingly, the client displays the live stream added with the interaction prop, thereby implementing interaction between the user and the site.

In a process of implementing the embodiments of the present disclosure, the inventor found that at least the following problems exist in the related art: the live stream may arrive at the client with a delay for some causes, for example, the live broadcast is delayed live broadcast rather than synchronous live broadcast, or there is a certain delay due to network transmission time delay. This causes a relatively long time delay (for example, 50 seconds) between an instant at which the user watches the live stream added with the interaction prop and an instant at which the user sends the interaction instruction, making it impossible to timely feedback whether the interaction instruction is successfully sent or not to the user.

SUMMARY

In order to solve the problem of the related art, the embodiment of the present disclosure provides a live interaction system, an information sending method, an information receiving method and equipment. The technical solutions are implemented as follows.

According to a first aspect of the embodiment of the present disclosure, a live interaction system is provided, which may include: at least one client and an interaction platform. The client may be configured to send to the interaction platform an interaction instruction for instructing the interaction platform to add an interaction prop into a live stream. The interaction platform may be configured to, after receiving the interaction instruction, intercept an image frame from a current live stream, generate instant feedback information according to the image frame and the interaction prop indicated by the interaction instruction, and send the instant feedback information to the client. The client may further be configured to receive the instant feedback information from the interaction platform and display the instant feedback information.

According to a second aspect of the embodiment of the present disclosure, an information sending method is provided, which may include: receiving from a client, an interaction instruction for instructing the interaction platform to add an interaction prop into a live stream; after receiving the interaction instruction, intercepting an image frame from the current live stream; generating instant feedback information according to the image frame and the interaction prop indicated by the interaction instruction; and sending the instant feedback information to the client which sends the interaction instruction.

According to a third aspect of the embodiment of the present disclosure, an information receiving method is provided, which may include: sending to an interaction platform an interaction instruction for instructing the interaction platform to add an interaction prop into a live stream; receiving instant feedback information from the interaction platform, wherein the instant feedback information is generated according to an image frame intercepted from a current live stream after the interaction platform receives the interaction instruction and the interaction prop indicated by the interaction instruction; and displaying the instant feedback information According to a fourth aspect of the embodiment of the present disclosure, an information sending device is provided, which may include: a first receiving module, configured to receive from a client an interaction instruction for instructing an interaction platform to add an interaction prop into a live stream; an interception module, configured to, after the interaction instruction is received, intercept an image frame from a current live stream; a generation module, configured to generate instant feedback information according to the image frame and the interaction prop indicated by the interaction instruction; and a first sending module, configured to send the instant feedback information to the client which sends the interaction instruction.

According to a fifth aspect of the embodiment of the present disclosure, an information receiving device is provided, which may include: a second sending module, configured to send to an interaction platform an interaction instruction for instructing the interaction platform to add an interaction prop into a live stream; a second receiving module, configured to receive instant feedback information from the interaction platform, wherein the instant feedback information may be generated according to an image frame intercepted from a current live stream after the interaction platform receives the interaction instruction and the interaction prop indicated by the interaction instruction; and a display module, configured to display the instant feedback information.

According to a sixth aspect of the embodiment of the present disclosure, a server is provided, which may include: one or more processors; and a memory, wherein the memory may store one or more programs, the one or more programs may be configured to be executed by the one or more processors, and the one or more programs may include instructions configured to execute the following operations: receiving, from a client, an interaction instruction for instructing the interaction platform to add an interaction prop into a live stream; intercepting an image frame from the current live stream, after receiving the interaction instruction; generating instant feedback information according to the image frame and the interaction prop indicated by the interaction instruction; and sending the instant feedback information to the client which sends the interaction instruction.

According to a seventh aspect of the embodiment of the present disclosure, a terminal is provided, which may include: one or more processors; and a memory, wherein the memory may store one or more programs, the one or more programs may be configured to be executed by the one or more processors, and the one or more programs may include instructions configured to execute the following operations: sending to an interaction platform an interaction instruction for instructing the interaction platform to add an interaction prop into a live stream; receiving instant feedback information from the interaction platform, wherein the instant feedback information is generated according to an image frame intercepted from a current live stream after the interaction platform receives the interaction instruction and the interaction prop indicated by the interaction instruction; and displaying the instant feedback information.

The technical solutions provided by the embodiment of the present disclosure may achieve the following beneficial effects.

After the interaction platform receives the interaction instruction, the image frame is intercepted from the current live stream, the instant feedback information is generated according to the image frame and the interaction prop indicated by the interaction instruction, the instant feedback information is sent to the client which sends the interaction instruction, and the client receives and displays the instant feedback information, so that the problem of cannot timely feeding back whether the interaction instruction is successfully sent or not to a user due to a delay of arrival of the live stream at the client is solved; and since the instant feedback information is not required to be sent to the client together with the live stream added with the interaction prop, and the instant feedback information may reach the client earlier than the live stream added with the interaction prop, so that the user may timely learn about that the interaction instruction has been successfully sent according to the instant feedback information returned by the interaction platform, and furthermore, the technical effect of avoiding interaction prop waste caused by the user's repeated sending of the interaction instruction may be achieved.

BRIEF DESCRIPTION OF THE DRAWINGS

In order to describe the technical solutions in the embodiment of the present disclosure more clearly, the accompanying drawings to which description of the embodiments are referred will be simply introduced below. Obviously, the accompanying drawings described below only illustrate some embodiments of the present disclosure, and those skilled in the art may further contemplate other accompanying drawings according to these accompanying drawings without creative work.

DETAILED DESCRIPTION

In order to make a purpose, technical solutions and advantages of the present disclosure clearer, embodiments of the present disclosure will be further described below with reference to the accompanying drawings in detail.

System Environment

Figure 1:
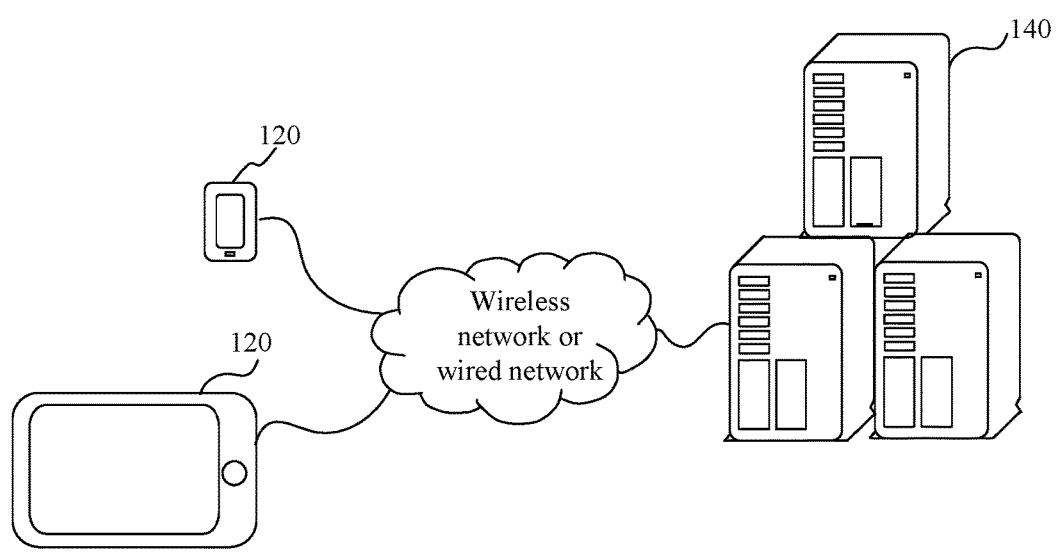
FIG. 1 is a structure diagram of a live interaction system, according to an embodiment of the present disclosure.

FIG. 1 is a structure diagram of a live interaction system, according to an embodiment of the present disclosure. The system includes at least one terminal 120 and an interaction platform 140.

The terminal 120 has a video play function. Under a normal condition, a client with the video play function is installed in the terminal 120, such that a user may watch a video through the client. For example, the client may be a video play client (such as a Youku client, an iQIYI client, an SHPlayer client, a Baidu player client, a LeTV client and a QQ live client), a live video client (such as a YY client and a KuGoo Fanxing client), a rich communication client or the like. In addition, the client may also be a browser, and the user accesses a live video website and watch a live video through the browser. Here, the live video website refers to a website which provides live videos. In the embodiment of the present disclosure, there is no limit to content of the live video, which may be, for example, a live variety video, a live concert video, a live sports video and a live reality video. In the embodiment of the present disclosure, there is also no limit to the type of the live broadcast, which may be delayed live broadcast, and may also be synchronous live broadcast. In addition, the terminal 120 may be a mobile phone, a tablet computer, an electronic book reader, a Moving Picture Experts Group Audio Layer III (MP3) player, a Moving Picture Experts Group Audio Layer IV (MP4) player, a portable laptop computer, a desktop computer and the like.

The terminal 120 may establish communication connection with the interaction platform 140 over a wired network or a wireless network.

The interaction platform 140 is configured to provide live video resources, and send a live stream to the at least one terminal 120. Under a normal condition, the interaction platform 140 sends the live stream to the client installed and running in the terminal 120, and then the client decodes and plays the live stream. The interaction platform 140 may be a server, or a server cluster consisting of a plurality of servers, or a cloud computing service center.

In a possible implementation scenario, an anchor of a live broadcasting program may send live stream data to the interaction platform 140 through a client, the interaction platform 140 pushes the live stream data to the at least one terminal 120 watching the live program, and the terminal 120 may decode and play the received live stream data. The user may also send an interaction prop to the anchor when watching the live broadcasting program hosted by the anchor through the terminal 120, the interaction prop is an Internet virtual object, for example, the interaction prop may be a virtual object such as a virtual flower, a virtual gold coin or a virtual sycee, and the type of the interaction prop will not be limited in the embodiment of the present disclosure.

Figure 2:
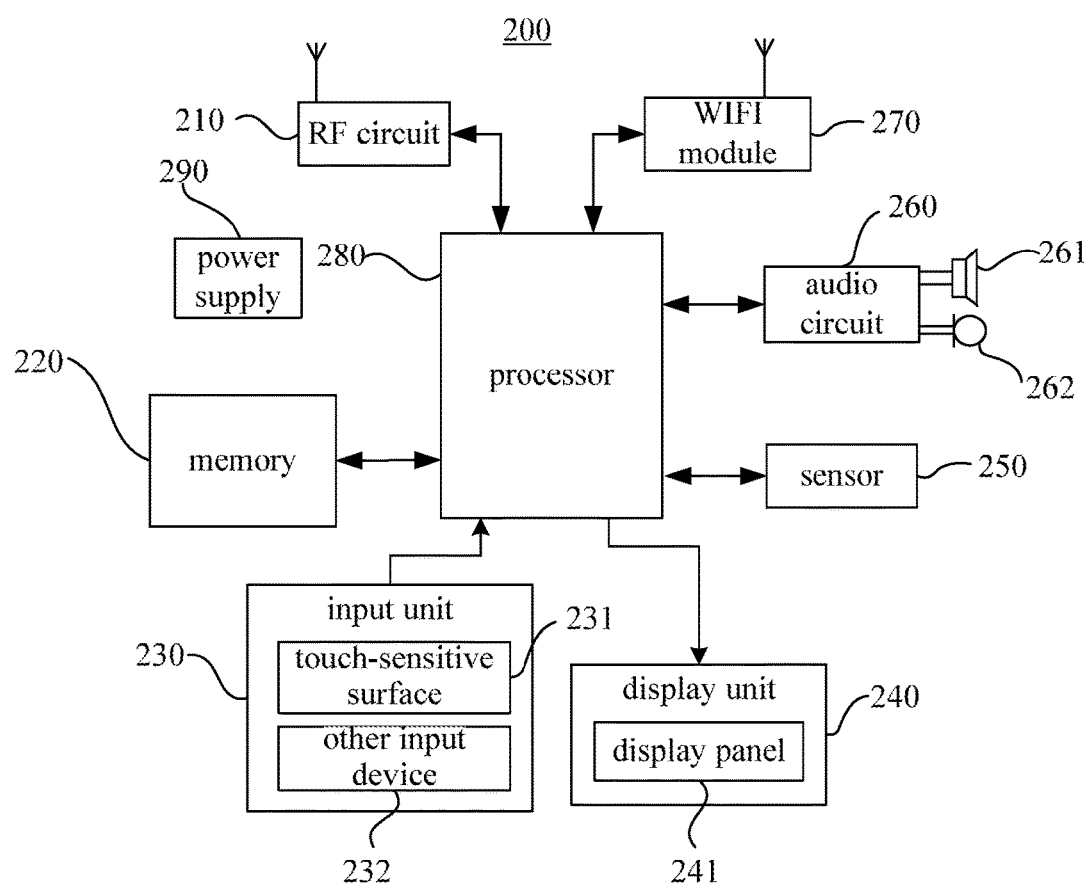
FIG. 2 is a structure diagram of a terminal, according to an embodiment of the present disclosure.

Computer Architecture FIG. 2 is a structural diagram of a terminal, according to an embodiment of the present disclosure. The terminal may be the terminal 120 in FIG. 1.

Specifically, the terminal 200 may include the following components: a Radio Frequency (RF) circuit 210, a memory 220 including one or more computer-readable storage media, an input unit 230, a display unit 240, a sensor 250, an audio circuit 260, a short-distance wireless transmission module 270, a processor 280 including one or more processing cores, a power supply 290 and etc. Those skilled in the art may appreciate that the terminal structure shown in FIG. 2 is not intended to limit the terminal, and may include more or fewer components than those shown in the figure, or some of the components may be combined, or may be arranged in different manners.

The RF circuit 210 may be configured to receive and send a signal in an information transceiving or conversation process, particularly, transmit downlink information from a base station to one or more processors 280 for processing, and also send involved uplink data to the base station. Usually, the RF circuit 210 includes, but is not limited to, an antenna, at least one amplifier, a tuner, one or more oscillators, a Subscriber Identity Module (SIM) card, a transceiver, a coupler, a Low Noise Amplifier (LNA), a duplexer and the like. In addition, the RF circuit 210 may further communicate with a network and other equipment in a wireless communication manner. Wireless communication may be performed under any communication standard or protocol, including, but not limited to, Global System of Mobile Communication (GSM), General Packet Radio Service (GPRS), Code Division Multiple Access (CDMA), Wideband Code Division Multiple Access (WCDMA), Long Term Evolution (LTE), electronic mail, Short Messaging Service (SMS) and the like. The memory 220 may be configured to store software programs and modules. The processor 280 runs the software programs and modules stored in the memory 220, thereby executing various function applications and data processing. The memory 220 may mainly include a program storage area and a data storage area. The program storage area may store operating systems, applications required by at least one function (such as a sound play function and an image play function) and the like. The data storage area may store data (such as audio data and a telephone book) created according to use of the terminal 200 and the like. In addition, the memory 220 may include a high speed random access memory, and may further include a nonvolatile memory, such as at least one disk memory, a flash memory or other volatile solid state memory. Correspondingly, the memory 220 may further include a memory controller for providing access to the memory 220 for the processor 280 and the input unit 230.

The input unit 230 may be configured to receive input digital or character information and generate keyboard, mouse, operating rod, optical or trackball signal input related to user setting and function control. Specifically, the input unit 230 may include a touch-sensitive surface 231 and other input equipment 232. The touch-sensitive surface 231, also called a touch display screen or a touchpad, may collect touch operation of a user thereon or nearby (such as operation of the user executed on the touch-sensitive surface 231 or nearby the touch-sensitive surface 231 by virtue of any proper object such as a finger and a stylus) and drive a corresponding connection device according to a preset formula. Optionally, the touch-sensitive surface 231 may include two parts, i.e. a touch detection device and a touch controller. The touch detection device detects a touch direction of the user, detects a signal generated by the touch operation, and sends the signal to the touch controller; and the touch controller receives touch information from the touch detection device, converts the received touch information into a touch coordinate, and sends the touch coordinate to the processor 280, and may receive and execute a command sent by the processor 280. In addition, the touch-sensitive surface 231 may be of a resistor type, a capacitor type, an infrared ray type, a surface acoustic wave type or the like. Besides the touch-sensitive surface 231, the input unit 230 may further include the other input equipment 232. Specifically, the other input equipment 232 may include, but is not limited to, one or more of a physical keyboard, a function key (such as a volume control key and an on/off key), a trackball, a mouse, an operating rod and the like.

The display unit 240 may be configured to display information input by the user or information provided for the user and various graphic user interfaces of the terminal 200, and these graphic user interfaces may be formed by graphics, texts, icons, videos and any combinations thereof. The display unit 240 may include a display panel 241, and the display panel 241 may be optionally configured in form of Liquid Crystal Display (LCD), Organic Light-Emitting Diode (OLED) and the like. Furthermore, the touch-sensitive surface 231 may cover the display panel 241. The touch operation on or nearby the touch-sensitive surface 231, after being detected, is sent to the processor 280 to determine a type of a touch event, and then the processor 280 provides corresponding visual output on the display panel 241 according to the type of the touch event. Although the touch-sensitive surface 231 and display panel 241 in FIG. 2 implement input and output functions as two independent components, the touch-sensitive surface 231 and the display panel 241 may be integrated to implement the input and output functions in some embodiments.

The terminal 200 may further include at least one sensor 250, such as a light sensor, a motion sensor and other sensors. Specifically, the light sensor may include an ambient light sensor and a proximity sensor. The ambient light sensor may regulate luminance of the display panel 241 according to brightness of ambient light, and the proximity sensor may turn off the display panel 241 and/or backlight when the terminal 200 moves to an ear. As a type of a motion sensor, a gravity acceleration sensor may detect a magnitude of acceleration in each direction (usually in three axes), may detect a magnitude and direction of gravity under a still condition, and may be used in applications identifying orientation of the terminal (such as horizontal and vertical screen switching, a related game and magnetometer orientation calibration), a vibration identification related function (such as a pedometer and knocking) and the like; and the other sensor, such as a gyroscope, an air pressure gauge, a hygrometer, a thermometer and an infrared sensor, which may be configured in the terminal 200 will not be elaborated herein.

The audio circuit 260, a loudspeaker 221 and a microphone 222 may provide an audio interface between the user and the terminal 200. The audio circuit 260 may convert received audio data to an electric signal and send the electric signal to the loudspeaker 221, and the loudspeaker 221 converts the electric signal into a sound signal for output; and on the other hand, the microphone 222 collects a sound signal, converts the sound signal into an electric signal, and the audio circuit 260 receives and converts the electric signal into audio data, outputs the audio data to the processor 280 for processing, and the processed audio data is sent to another terminal through the RF circuit 210, or output to the memory 220 for further processing. The audio circuit 260 may further include an earplug hole for providing communication between an external earphone and the terminal 200.

The short-distance wireless transmission module 270 may be a Wireless Fidelity (WIFI) module, a Bluetooth module or the like. The terminal 200 may help the user to send and receive electronic mails, browse web pages, access streaming media and the like through the short-distance wireless transmission module 270, and it provides wireless wideband Internet access for the user. Although the short-distance wireless transmission module 270 is shown in FIG. 2, it may be understood that it is not a necessary component of the terminal 200 and may be omitted according to practice without changing the scope of the nature of the present disclosure.

The processor 280, as a control center of the terminal 200, connects each part of the whole terminal by virtue of various interfaces and lines, and executes various functions and data processing of the terminal 200 by running or executing the software programs and/or modules stored in the memory 220 and calling the data stored in the memory 220, thereby monitoring the whole terminal. Optionally, the processor 280 may include one or more processing cores; and optionally, the processor 280 may integrate an application processor and a modulation and demodulation processor, wherein the application processor mainly takes charge of an operating system, a user interface, an application program and the like, and the modulation and demodulation processor mainly takes charge of wireless communication. It may be understood that the modulation and demodulation processor may also not be integrated into the processor 280.

The terminal 200 further includes the power supply 290 (such as a battery) for supplying power to each component, and preferably, the power supply may be logically connected with the processor 280 through a power management system, thereby implementing functions of charging and discharging management, power consumption management and the like through the power management system. The power supply 290 may further include one or more direct current or alternating current power supplies, a rechargeable system, a power failure detection circuit, a power converter or inverter, a power status indicator and the like.

Although not being shown, the terminal 200 may further include a camera, a Bluetooth module and the like, which will not be elaborated herein.

The terminal 200 further includes the memory and one or more programs, wherein the one or more programs are stored in the memory, and are configured to be executed by one or more processors.

Figure 3:
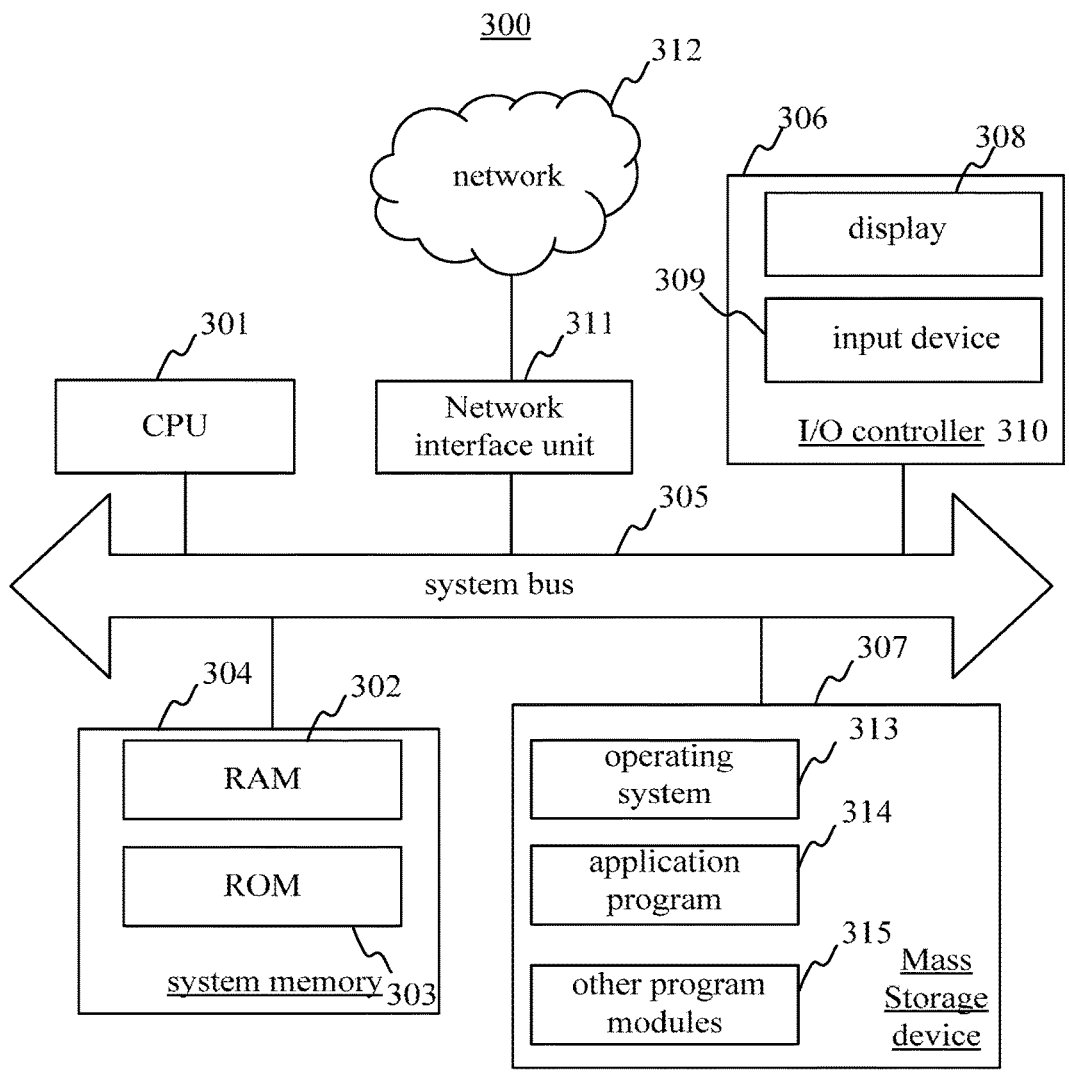
FIG. 3 is a structure diagram of a server, according to an embodiment of the present disclosure.

FIG. 3 is a structure diagram of a server, according to an embodiment of the present disclosure. The server may be a server in the interaction platform 140 in FIG. 1. The details are given below.

The server 300 includes a Central Processing Unit (CPU) 301, a system memory 304 including a Random Access Memory (RAM) 302 and a Read-Only Memory (ROM) 303, and a system bus 305 which connects the system memory 304 and the CPU 301. The server 300 further includes a basic Input/Output (I/O) system 306 which helps information transmission among individual components in a computer, and a high-capacity storage device 307 configured to store an operating system 313, an application program 314 and other program module 315.

The basic I/O system 306 includes a display 308 configured to display the information and input device 309, such as a mouse and a keyboard, for inputting the information by a user. The display 308 and the input device 309 are connected to the CPU 301 through an I/O controller 310 connected to the system bus 305. The basic I/O system 306 may further include the I/O controller 310 configured to receive and process input from multiple other devices such as a keyboard, a mouse and an electronic stylus. Similarly, the I/O controller 310 further provides output to a display screen, a printer or output device of another type.

The high-capacity storage device 307 is connected to the CPU 301 through a high-capacity storage controller (not shown) connected to the system bus 305. The high-capacity storage device 307 and its associated computer-readable medium provide nonvolatile storage for the server 300. That is, the high-capacity storage device 307 may include the computer-readable medium (not shown) such as a hard disk or a Compact Disc Read-Only Memory (CD-ROM) drive.

In general, the computer-readable medium may include a computer storage medium and a communication medium. The computer storage medium includes volatile, nonvolatile, removable and unremovable media configured to store information such as computer-readable instructions, data structures, program modules or other data and implemented by any method or technology. The computer storage medium includes a RAM, a ROM, an Erasable Programmable Read Only Memory (EPROM), an Electrically Erasable Programmable Read Only Memory (EEPROM), a flash memory or other solid state storage device, a CD-ROM, a Digital Video Disk (DVD) or other optical storage device, a tape cassette, a storage tap, a disk memory or other magnetic storage device. Of course, those skilled in the art should know that the computer storage medium is not limited to those mentioned above. The system memory 304 and the high-capacity storage device 307 may be collectively known as memories.

According to each embodiment of the present disclosure, the server 300 may further be connected to a remote computer on a network through the network such as the Internet for running. That is, the server 300 may be connected to the network 312 through a network interface unit 311 connected to the system bus 305, or, may also be connected to a network of another type or a remote computer system (not shown) through the network interface unit 311.

The memory also includes one or more programs, and the one or more programs are stored in the memory, and are configured to be executed by the CPU.

Schematic Embodiment

A client 120 is configured to send an interaction instruction to an interaction platform 140, the interaction instruction being configured to instruct the interaction platform 140 to add an interaction prop into a live stream.

Specifically, the client 120 is a client with a video play function, for example, the video play client, live video client or rich communication client described above. It is to be noted that the client 120 may also be a browser installed in a terminal, and a user may access a live video website to watch a live program through the browser.

The interaction platform 140 is configured to send the live stream to at least one client 120. The client 120, after receiving the live stream, decodes and plays the live stream. The user may also send an interaction prop to a live show site when watching a live video through the client 120, and the interaction prop may be a virtual object such as a virtual flower, a virtual gold coin and a virtual sycee.

When sending the interaction prop to the live program site, the user may select a type and number of an interaction prop to be sent and click a preset sending button to trigger the client 120 to send the interaction instruction to the interaction platform 140.

Figure 4A:
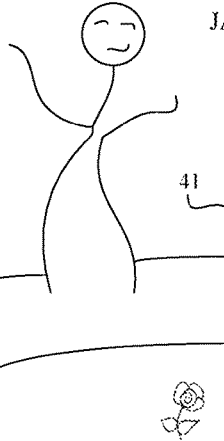
FIG. 4A illustrates a first display diagram in a live interaction system according to some embodiments.

For example, as shown in FIG. 4A, a flower presenting interface 41 is displayed in a live program interface, and the user may select a type and number of virtual flowers to be sent to the site and click an OK button 42 to trigger the client 120 to send an interaction instruction to the interaction platform 140, the interaction instruction containing the type and number of the virtual flowers selected by the user. After receiving a clicking signal of the OK button 42, the client 120 may also play a flower presenting animation to simulate a flower presenting action of the user.

The interaction platform 140 is configured to, after receiving the interaction instruction, intercept an image frame from a current live stream, generate instant feedback information according to the image frame and the interaction prop indicated by the interaction instruction and send the instant feedback information to the client 120.

Specifically, in order to enable the user having sent the interaction instruction through the client 120 to timely learn about that the interaction instruction has been successfully sent and in order to give a corresponding feedback, the interaction platform 140 intercepts a frame of image from the current live stream after receiving the interaction instruction, and generates the instant feedback information according to the image and the interaction prop indicated by the interaction instruction. The instant feedback information is used to provide a feedback that the interaction instruction has been successfully sent to the user.

In a possible implementation, the interaction platform 140 is specifically configured to: select an interaction template corresponding to the interaction prop from an interaction template library according to the interaction prop indicated by the interaction instruction, and synthesize the image frame and the interaction template into an interaction picture, the instant feedback information including at least the interaction picture. Here, the interaction template library includes interaction template(s) corresponding to at least one interaction prop. Each interaction prop may correspond to one or more interaction templates. Optionally, the interaction platform 140 determines, according to the type and number of the interaction prop in the interaction instruction, the corresponding interaction template.

After generating the instant feedback information, the interaction platform 140 sends the instant feedback information to the client 120 corresponding to the interaction instruction, i.e. the client 120 which sends the interaction instruction.

The client 120 is further configured to receive the instant feedback information from the interaction platform 140 and display the instant feedback information.

The interaction platform 140 is further configured to add the interaction prop indicated by the interaction instruction into the live stream, and send the live stream added with the interaction prop to the at least one client 120.

In order to enable the user to see an interaction prop sent to the live program site by the user or another person in a live video, the interaction platform 140 adds the interaction prop into the live stream according to the interaction prop indicated by the interaction instruction, and sends the live stream added with the interaction prop to all the clients 120 watching the live video.

The client 120 is further configured to receive the live stream added with the interaction prop from the interaction platform 140, and display the live stream added with the interaction prop.

It is to be noted that the interaction platform 140 sends the instant feedback information to the client 120 in real time, and after sending the interaction instruction, the client 120 may receive the live stream added with the prop after a certain delay due to a factor such as a delayed live program or a network delay. The user may learn about that the interaction instruction has been successfully sent after receiving the instant feedback information. Therefore, the phenomenon that the user who does not know whether the interaction instruction is successfully sent or not repeatedly sends the interaction instruction for many times to cause waste of the interaction prop is avoided.

Figure 4B:
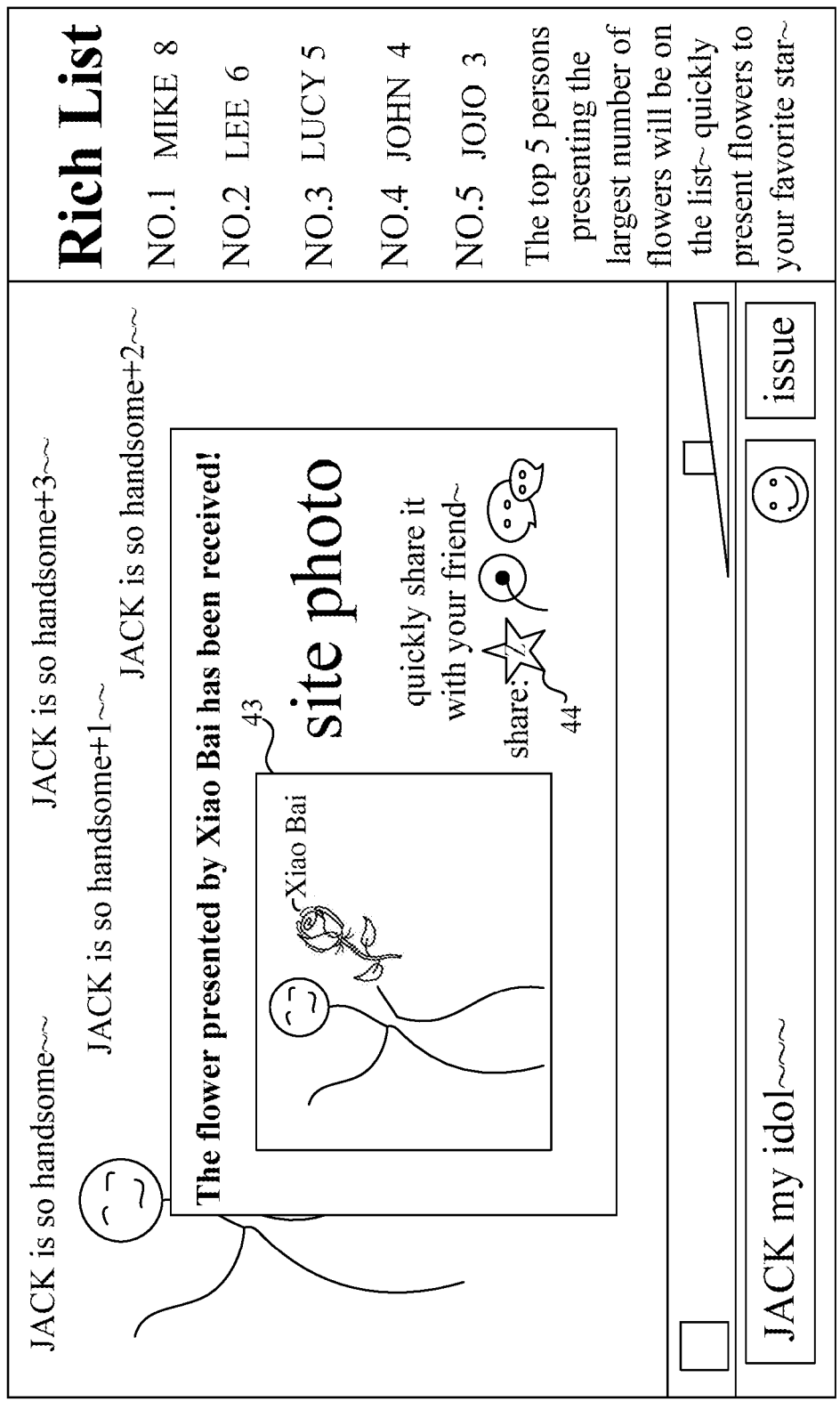
FIG. 4B illustrates a second display diagram.

As shown in FIG. 4B, the interaction platform 140, after receiving the interaction instruction from the client 120, generates the interaction picture 43 according to the intercepted image frame and the interaction prop indicated by the interaction instruction, and sends it to the client 120; and the client 120 displays the received interaction picture.

Optionally, in order to improve user experiences and attract more users to watch the live video, the client 120 is further configured to display a sharing entry corresponding to the instant feedback information, and send a sharing request to a third-party server through the sharing entry.

The user may share the received instant feedback information through the sharing entry. As shown in FIG. 4B, the client 120 may display a sharing icon 44 corresponding to the interaction picture 43 at the same time of displaying the interaction picture 43, such that when the user clicks the sharing icon 44, the client 120 shares the interaction picture 43.

The third-party server shares the instant feedback information to a specified client after receiving the sharing request from the client 120.

The third-party server sends the instant feedback information to at least one client which has a friendship with the client 120 in an instant message. Or, the third-party server sends at least one client in a same group with the client 120 in form of group message. Alternatively, the third-party server displays the instant feedback information in a social information sharing platform of the client 120. Here, information in the social information sharing platform of the client 120 can be viewed by a client which has a social relationship with the client 120 and has an access to the social information sharing platform. Alternatively, the third-party server displays the instant feedback information in a microblog information sharing platform of the client 120. Here, information in the microblog information sharing platform of the client 120 can be viewed by a client which has a social relationship with the client 120 and has an access to the microblog information sharing platform.

Optionally, the interaction platform 140 is further configured to, when the type of the interaction prop is a preset type and/or the number of the interaction prop is larger than a preset threshold value, add an identifier of the client which sends the interaction prop in the live stream.

When adding the interaction prop indicated by the interaction instruction into the live stream, the interaction platform 140 detects whether the type of the interaction prop is the preset type or not and/or whether the number of the interaction prop is larger than the preset threshold value or not, and sends the identifier of the client 120 which sends the interaction prop into the live stream when the type of the interaction prop is the preset type and/or the number of the interaction prop is larger than the preset threshold value. Here, the identifier of the client 120 may be a username used when the user logs in the client 120.

Figure 4C:
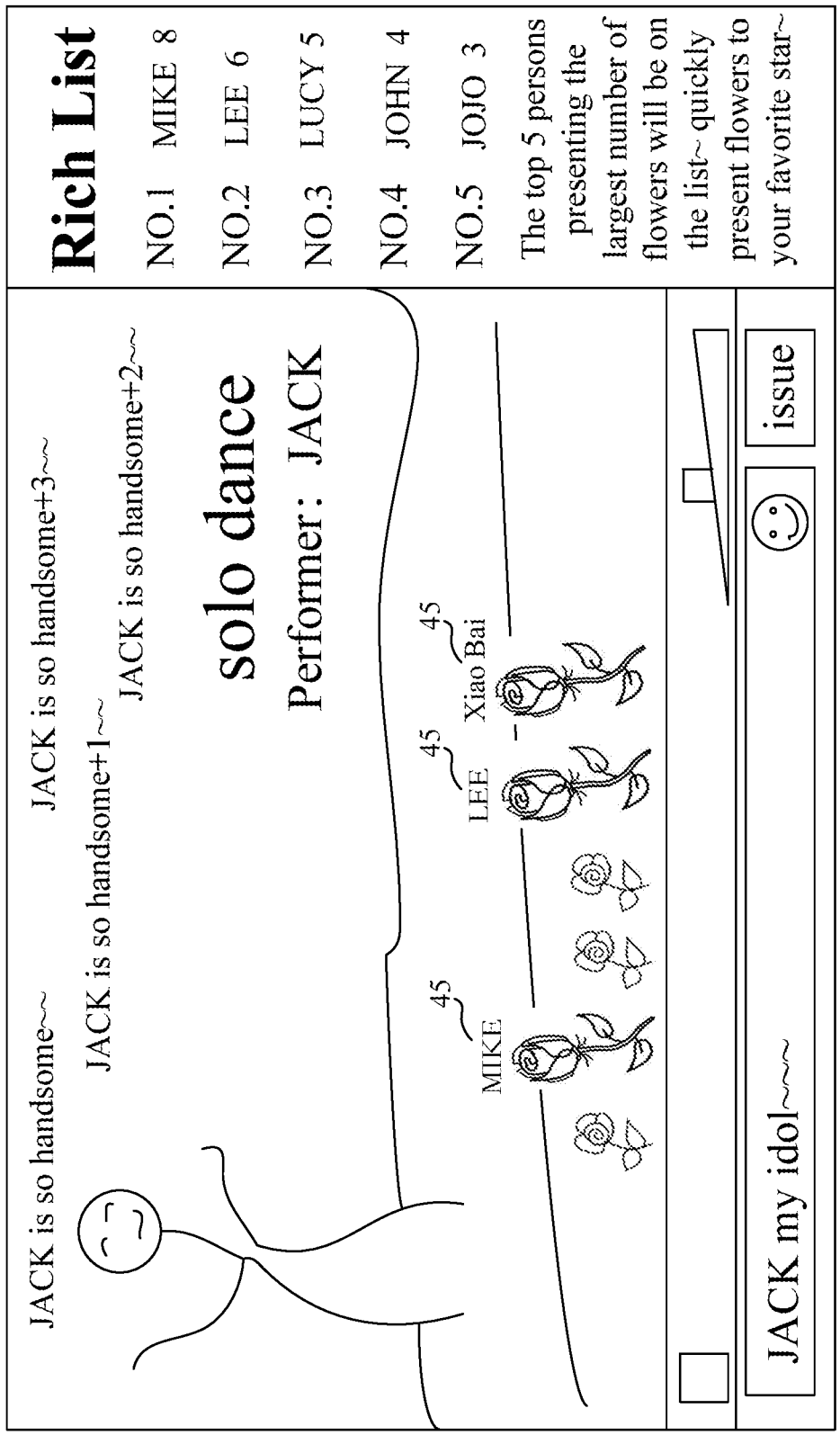
FIG. 4C illustrates a third display diagram.

As shown in FIG. 4C, the interaction platform 140 acquires an interaction instruction, in which the type of the interaction prop is "rose", and sends the identifier of the client 120 which sends the interaction instruction into the live stream, and the client 120 displays the identifier 45 of the client 120 in the live stream.

Before sending the interaction prop to the site, the user has to purchase the interaction prop in advance. Optionally, the client 120 is further configured to send a prop acquisition instruction to the interaction platform 140, the prop acquisition instruction containing the type and number of the interaction prop; and the interaction platform 140 is further configured to transfer a corresponding number of resources from an account corresponding to the client 120 to an account corresponding to the interaction platform 140 according to the type and number of the interaction prop, and send an exchange success indication to the client 120. The exchange success indication is used to notify the client 120 of the interaction prop that has been successfully exchanged and thus acquired as requested. Optionally, the exchange success indication contains the type and number of the interaction prop which has been successfully exchanged. The client 120 is further configured to receive the exchange success indication from the interaction platform 140, and update the number of the interaction props that the user owns currently.

Figure 4D:
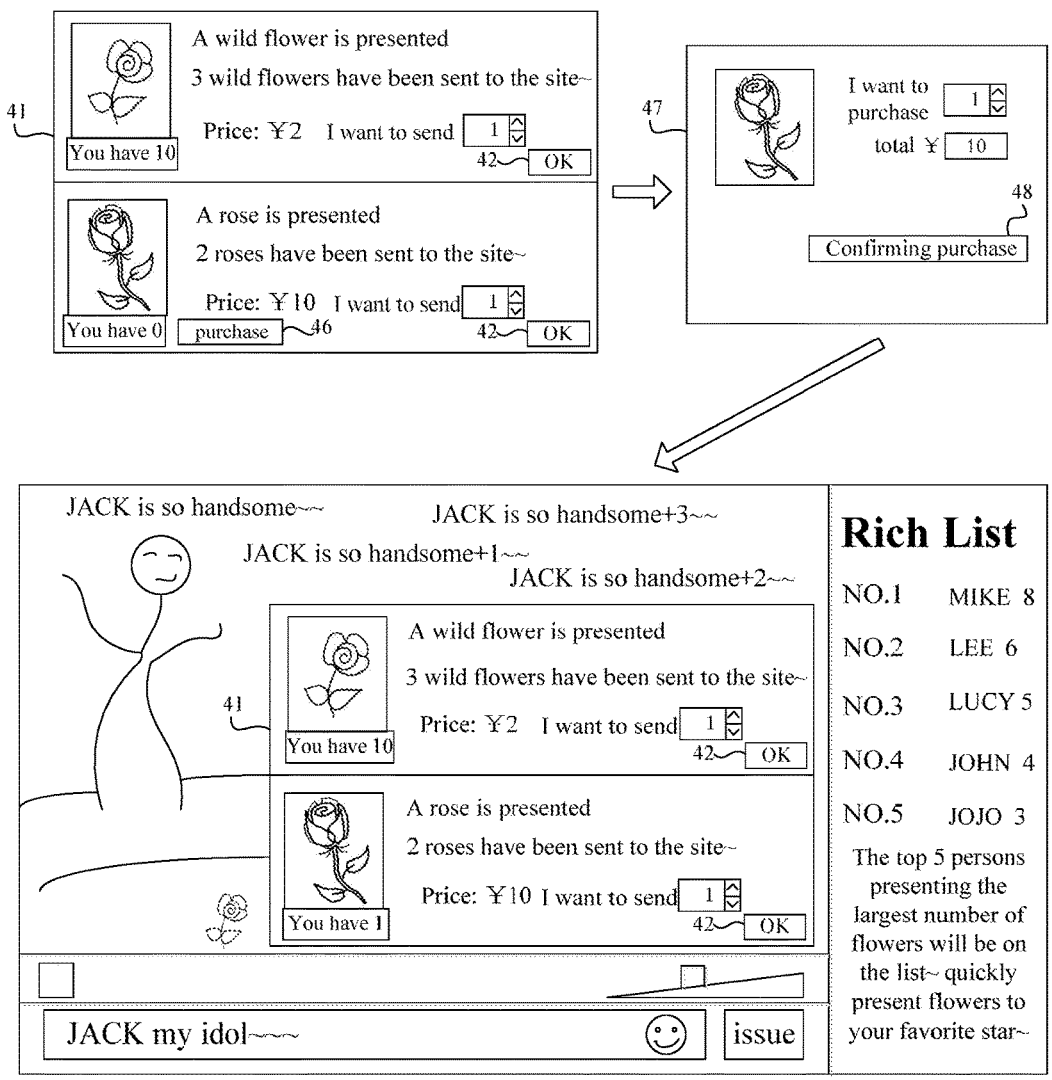
FIG. 4D illustrates a fourth display diagram.

As shown in FIG. 4D, when the user clicks a purchase button 46, the client 120 may display a purchase interface 47, and the user inputs the number of the interaction prop he/she wishes to be purchase, and clicks a purchase confirmation button 48 to finish purchasing. After successful purchasing, the client 120 updates the number of the interaction prop on the flower presentation interface 41.

In view of the above, according to the live interaction system provided by the embodiment, after the interaction platform receives the interaction instruction, the image frame is intercepted from the current live stream, the instant feedback information is generated according to the image frame and the interaction prop indicated by the interaction instruction, the instant feedback information is sent to the client which sends the interaction instruction, and the client receives and displays the instant feedback information, so that the problem of cannot timely feeding back whether the interaction instruction is successfully sent or not to a user due to a delay of arrival of the live stream at the client is solved; and since the instant feedback information is not required to be sent to the client together with the live stream added with the interaction prop, and the instant feedback information may reach the client earlier than the live stream added with the interaction prop, so that the user may timely learn about that the interaction instruction has been successfully sent according to the instant feedback information returned by the interaction platform, and furthermore, the technical effect of avoiding interaction prop waste caused by the user's repeated sending of interaction instruction may be achieved.

In the embodiment, the client further provides the sharing entry corresponding to the instant feedback information for the user, so that the user may conveniently and timely share the instant feedback information to a friend, thus improving interaction experiences of the user, and implementing secondary propagation of the instant feedback information.

In the embodiment, the interaction platform further adds the identifier corresponding to the client which sends the interaction instruction into the live stream according to the type and/or number of the interaction prop in the interaction instruction from the client when the type and/or number of the interaction prop meet/meets (a) preset condition(s), so that the interaction experiences of the user are improved, and the user may know that the interaction instruction has been successfully sent more intuitively.

In order to describe the embodiment of the present disclosure in more detail, an operation principle of an information presenting system provided by the embodiment of the present disclosure will be elaborated below with method embodiments.

Figure 5:
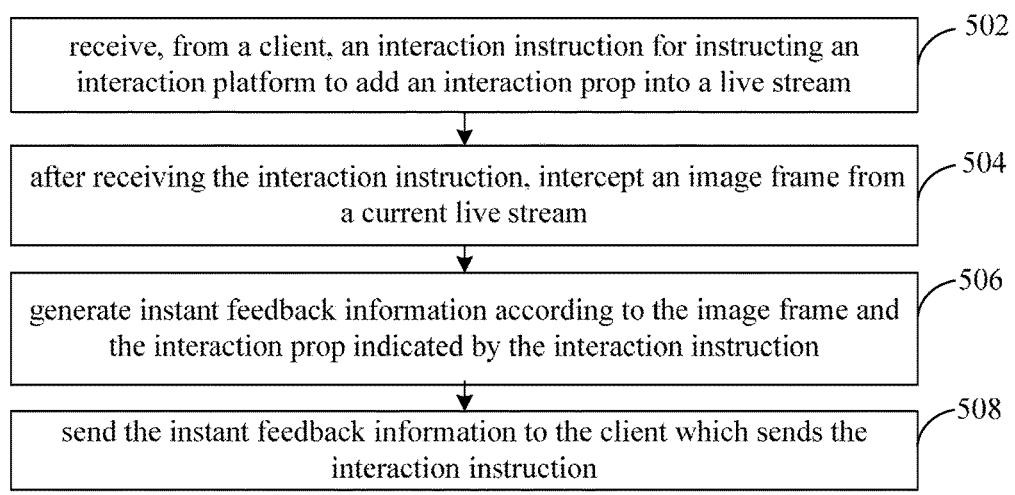
FIG. 5 is a flow chart showing an information sending method, according to an embodiment of the present disclosure.

FIG. 5 is a flow chart showing an information sending method, according to an embodiment of the present disclosure. The embodiment is described with application of the information sending method to the interaction platform 140 shown in FIG. 1 as an example. The method includes the following steps.

Step 502: an interaction instruction sent by a client is received, the interaction instruction being used to instruct an interaction platform to add an interaction prop into a live stream.

Step 504: after the interaction instruction is received, an image frame is intercepted from a current live stream.

Step 506: instant feedback information is generated according to the image frame and the interaction prop indicated by the interaction instruction.

Step 508: the instant feedback information is sent to the client which sends the interaction instruction.

In view of the above, according to the information sending method provided by the embodiment, after the interaction platform receives the interaction instruction, the image frame is intercepted from the current live stream, the instant feedback information is generated according to the image frame and the interaction prop indicated by the interaction instruction, the instant feedback information is sent to the client which sends the interaction instruction, and the client receives and displays the instant feedback information, so that the problem of cannot timely feeding back whether the interaction instruction is successfully sent or not to a user due to a delay of arrival of the live stream at the client is solved; and since the instant feedback information is not required to be sent to the client together with the live stream added with the interaction prop, and the instant feedback information may reach the client earlier than the live stream added with the interaction prop, so that the user may timely learn about that the interaction instruction has been successfully sent according to the instant feedback information returned by the interaction platform, and furthermore, the technical effect of avoiding interaction prop waste caused by the user's repeated sending of the interaction instruction may be achieved.

Figure 6:
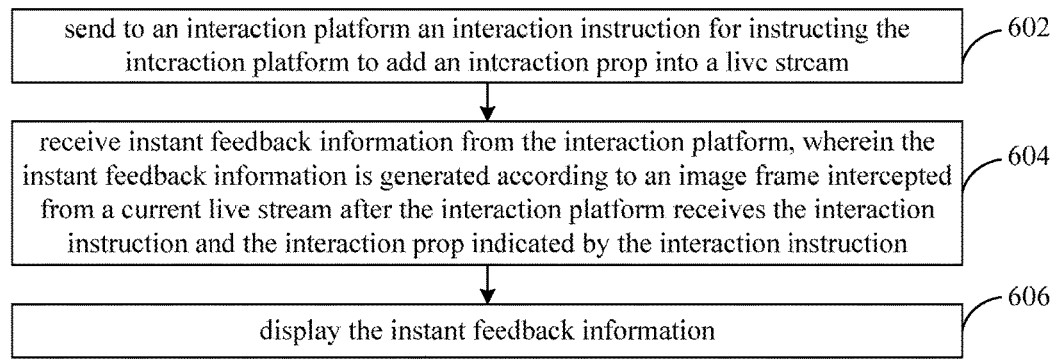
FIG. 6 is a flow chart showing an information receiving method, according to an embodiment of the present disclosure.

FIG. 6 is a flow chart showing an information receiving method, according to an embodiment of the present disclosure. The embodiment is described with application of the information receiving method to a client running in the terminal 120 shown in FIG. 1 as an example. The method includes the following steps.

Step 602: an interaction instruction is sent to an interaction platform, the interaction instruction being used to instruct the interaction platform to add an interaction prop into a live stream.

Step 604: instant feedback information sent by the interaction platform is received; here, the instant feedback information may be generated according to an image frame intercepted, after the interaction platform receives the interaction instruction, from a current live stream and the interaction prop indicated by the interaction instruction.

Step 606: the instant feedback information is displayed.

In view of the above, according to the information receiving method provided by the embodiment, after the interaction platform receives the interaction instruction, the image frame is intercepted from the current live stream, the instant feedback information is generated according to the image frame and the interaction prop indicated by the interaction instruction, the instant feedback information is sent to the client which sends the interaction instruction, and the client receives and displays the instant feedback information, so that the problem of cannot timely feeding back whether the interaction instruction is successfully sent or not to a user due to a delay of arrival of the live stream at the client is solved; and since the instant feedback information is not required to be sent to the client together with the live stream added with the interaction prop, and the instant feedback information may reach the client earlier than the live stream added with the interaction prop, so that the user may timely learn about that the interaction instruction has been successfully sent according to the instant feedback information returned by the interaction platform, and furthermore, the technical effect of avoiding interaction prop waste caused by the user's repeated sending of the interaction instruction may be achieved.

Figure 7:
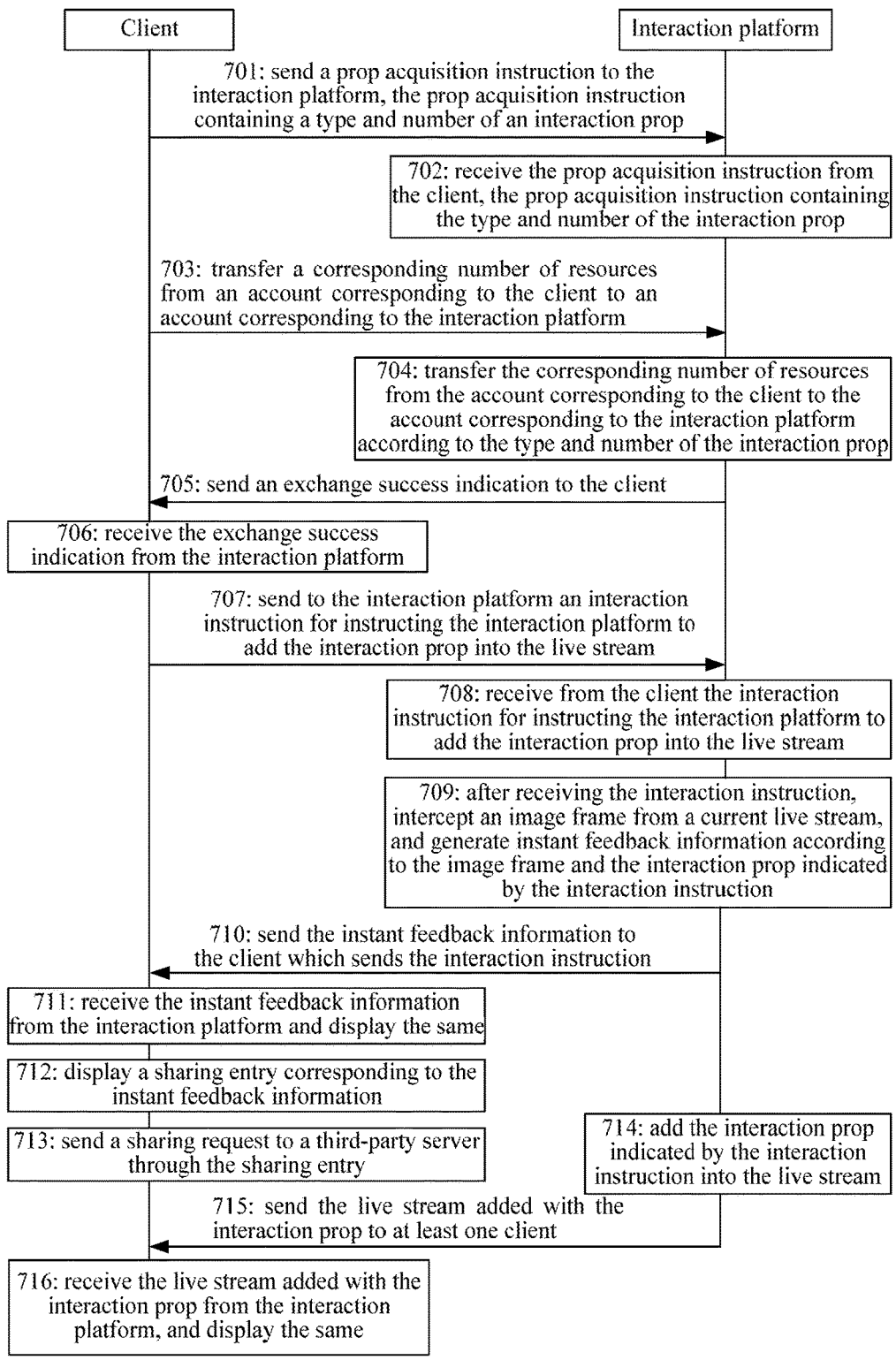
FIG. 7 is a flow chart showing an information sending method, according to another embodiment of the present disclosure.

FIG. 7 is a flow chart showing an information sending method, according to another embodiment of the present disclosure. The embodiment is described with application of the information sending method to the live interaction system shown in FIG. 1 as an example. The method includes the following steps.

Step 701: a client sends a prop acquisition instruction to an interaction platform, the prop acquisition instruction containing a type and number of an interaction prop.

Before sending an interaction prop to a live show site through the client, a user has to purchase the interaction prop in advance.

As shown in FIG. 4D, the number of the interaction prop that the user owns currently is displayed in a flower presenting interface 41, and when the number is smaller than a preset threshold, a purchase button 46 is also displayed in the flower presenting interface 41. After the user clicks the purchase button 46, the client displays the purchase interface 47. The user fills a desired purchasing number into the purchase interface 47, and clicks a purchase confirmation button 48, and then the client sends the prop acquisition instruction to the interaction platform. Here, the type and number of the interaction prop in the prop acquisition instruction is "rose" and 1 respectively.

It is to be noted that the client may send a prop number acquisition request to the interaction platform to acquire the number of the prop(s) that the user owns currently and display the purchase button when the number is smaller than the preset threshold; and the client may also display the purchase button when detecting that the number of the interaction prop that the user wishes to present is larger than the number of the interaction prop that the user owns currently, which is not limited in the present disclosure.

Step 702: the interaction platform receives the prop acquisition instruction from the client, the prop acquisition instruction containing the type and number of the interaction prop.

Correspondingly, the interaction platform receives the prop acquisition instruction from the client, and acquires the type and number of the interaction prop in the prop acquisition instruction.

For example, the interaction platform receives the prop acquisition instruction from the client, and acquires the type "rose" and number "1" of the interaction prop therein.

Step 703: the client transfers a corresponding number of resources from an account corresponding to the client to an account corresponding to the interaction platform.

When acquiring the interaction prop, the client is required to exchange it with preset resources, and the preset resources may be cash, credits, sycees, beans and the like.

The client is also required to transfer the corresponding number of resources from the account corresponding to the client to the account corresponding to the interaction platform according to the type and number of the interaction prop that the user wishes to acquire when sending the prop acquisition request to the interaction platform.

For example, as shown in FIG. 4D, the client acquires an interaction prop, that the user wishes to purchase, with the type "rose" and the number "1." As the unit price of the interaction prop of the type "rose" is ¥10, the client calculates the number of resources to be exchanges is ¥10 according to the unit price and the number, that is, ¥10 is transferred from the account corresponding to the client to the account corresponding to the interaction platform.

Step 704: the interaction platform transfers the corresponding number of resources from the account corresponding to the client to the account corresponding to the interaction platform according to the type and number of the interaction prop.

Correspondingly, the interaction platform receives the resources transferred from the account corresponding to the client to the account corresponding to the interaction platform, and detects whether the number of the resources is consistent with the type and number of the interaction prop in the prop acquisition request or not.

For example, the interaction platform receives ¥10 transferred from the account corresponding to the client, and acquires an prop acquisition request in which the type and number of the interaction prop are "rose" and "1" respectively. Since the unit price of the interaction prop of which the type is "rose" is ¥10, the number of the resources corresponding to the prop acquisition request is calculated to be ¥10, and is consistent with the number of the resources transferred from the account corresponding to the client.

Step 705: the interaction platform sends an exchange success indication to the client.

When detecting that the number of the resources transferred from the account corresponding to the client is consistent with the type and number of the interaction prop in the prop acquisition request, the interaction platform adds the corresponding type and number of interaction prop into an interaction prop library corresponding to the client.

Moreover, the interaction platform sends the exchange success indication to the client. The exchange success indication is used to notify the client of the interaction prop that has been successfully exchanged and acquired as requested.

Optionally, the exchange success indication contains the type and number of the successfully exchanged interaction prop.

Step 706: the client receives the exchange success indication from the interaction platform.

Correspondingly, the client receives the exchange success indication from the interaction platform, and updates the number of the interaction prop that the user owns currently.

For example, as shown in FIG. 4D, the number of roses that the user owns currently is 0 before the roses are purchased, and the number of the roses that the user owns currently is updated to be 1 after successful purchasing.

Step 707: the client sends to the interaction platform an interaction instruction for instructing the interaction platform to add the interaction prop into a live stream.

After purchasing the corresponding interaction prop, the user may send to the interaction platform an interaction instruction for sending the corresponding interaction prop to the live show site and instructing the interaction platform to add the interaction prop into the returned live stream.

As a possible implementation, the step may include the following steps.

Step 707A: the client adds the type and number of the interaction prop added into the live stream into the interaction instruction.

Since the user may send different types of interaction props to the live program site and may send multiple interaction props at the same time, the client has to add the type and number of the interaction props to be sent to the live program site at this time when receiving an interaction instruction sending signal triggered by the user, and adds the type and the number into the interaction instruction.

For example, as shown in FIG. 4D, the client adds the type "wild flower" and number "1" corresponding to the interaction prop into the interaction instruction when the user clicks an OK button 42 corresponding to wild flower presentation.

For another example, the client adds the type "rose" and number "1" corresponding to the interaction prop into the interaction instruction when the user clicks the OK button 42 corresponding to rose presentation.

It is to be noted that the client has to detect whether the number of the interaction prop to be sent is larger than the number of the interaction prop that the user owns currently after receiving the interaction instruction sending signal triggered by the user, and when the number of the interaction prop to be sent is larger than the number of the interaction prop that the user owns currently, sends prompting information to prompt the user that the number of the interaction prop is insufficient, and displays a corresponding purchase interface.

Step 707B: the client sends the interaction instruction containing the type and number of the interaction prop to the interaction platform.

The client sends the interaction instruction containing the type and number of the interaction prop to the interaction platform.

Step 708: the interaction platform receives the interaction instruction from the client, the interaction instruction being used to instruct the interaction platform to add the interaction prop into the live stream.

Correspondingly, the interaction platform receives the interaction instruction, and acquires the type and number of the interaction prop in the interaction instruction.

Step 709: after receiving the interaction instruction, the interaction platform intercepts an image frame from a current live stream, and generates instant feedback information according to the image frame and the interaction prop indicated by the interaction instruction.

In order to enable the user to timely learn about whether the interaction instruction is successfully sent or not after sending the interaction instruction, the interaction platform may, after receiving the interaction instruction, generate the instant feedback information according to the image frame in the current live stream and the interaction prop indicated by the interaction instruction and send the instant feedback information to the client in real time to enable the user to learn about that the interaction instruction has been successfully sent.

As a possible implementation, the step may include the following steps.

Step 709A: the interaction platform intercepts the image frame from the current live stream.

Considering that there may be a certain time delay in a transmission process of the interaction instruction, the interaction platform acquires sending time of the interaction instruction after receiving the interaction instruction, determines a live stream corresponding to the sending time as the current live stream, and intercepts a frame of image from the current live stream.

Step 709B: the interaction platform selects an interaction template corresponding to the interaction prop from an interaction template library according to the interaction prop indicated by the interaction instruction.

The interaction template library includes interaction templates corresponding to at least one interaction prop. Each interaction prop corresponds to one or more interaction templates. Optionally, the interaction platform determines, according to the type and number of the interaction prop in the interaction instruction, the corresponding interaction template.

The interaction platform pre-stores multiple interaction templates, each interaction template corresponds to a different interaction prop type and number. A corresponding relationship between an interaction template and an interaction prop type and number may be schematically shown in Table 1.

TABLE 1

| Interaction prop type | Interaction prop number | Interaction template |
| --- | --- | --- |
| Wild flower | 1 | Interaction template A |
| Wild flower | 2 | Interaction template B |
| Wild flower | More than or equal to 3 | Interaction template C |
| Rose | 1 | Interaction template D |
| Rose | 2 | Interaction template E |
| Rose | More than or equal to 3 | Interaction template F |

For example, if the type and number of the interaction prop in the interaction instruction received by the interaction platform are "rose" and "1" respectively, the interaction platform selects interaction template D from the interaction template library.

Step 709C: the interaction platform synthesizes the image frame and the interaction template into an interaction picture.

The instant feedback information includes at least the interaction picture. For example, as shown in FIG. 4B, the interaction platform synthesizes the intercepted image frame and the selected interaction template D to generate the interaction picture 43 in FIG. 4B.

Optionally, the instant feedback information further includes user information corresponding to another client which sends an interaction instruction, for example, user information corresponding to another client which sends an interaction instruction at the same time with the present client, for another example, user information corresponding to another client of which interaction instruction is sent later or earlier than that of the present client by a time difference smaller than a preset value, for yet another example, user information corresponding to another client which sends an interaction instruction and has a friendship with of the client. The user information includes, but is not limited to, information such as a user nickname and a portrait.

Step 710: the interaction platform sends the instant feedback information to the client which sends the interaction instruction.

Step 711: the client receives the instant feedback information from the interaction platform, and displays it.

For example, as shown in FIG. 4B, the client receives and displays the instant feedback information 43 from the interaction platform.

Step 712: the client displays a sharing entry corresponding to the instant feedback information.

The sharing entry is configured for the user to share the instant feedback information to a specified client. As shown in FIG. 4B, the client displays a sharing icon 44 at the same time of displaying the instant feedback information 43.

Step 713: the client sends a sharing request to a third-party server through the sharing entry.

As shown in FIG. 4B, the user may click the sharing icon 44 to trigger the client to send the sharing request to the third-party server. Optionally, the client calls a client corresponding to the third-party server after acquiring a triggering signal corresponding to the sharing entry, and sends the sharing request to the third-party server through the client corresponding to the third-party server.

The sharing request is configured to request the third-party server to send the instant feedback information to at least one client which has a friendship with the client in an instant message. Alternatively, the sharing request is configured to request the third-party server to send the instant feedback information to at least one client in a same group with the client in a group message. Alternatively, the sharing request is configured to request the third-party server to display the instant feedback information in a social information sharing platform of the client, where information in the social information sharing platform of the client can be viewed by a client which has a social relationship with the client and has an access to the social information sharing platform. Alternatively, the sharing request is configured to request the third-party server to display the instant feedback information in a microblog information sharing platform of the client, where information in the microblog information sharing platform of the client can be viewed by a client which has a social relationship with the client and has an access to the microblog information sharing platform.

Step 714: the interaction platform adds the interaction prop indicated by the interaction instruction into the live stream.

When the interaction platform adds the interaction prop into the live stream, the interaction platform may send an identifier of the client which sends the interaction prop into the live stream with respect to a specific type of interaction prop or up to a certain number of interaction props.

As a possible implementation, the interaction platform acquires the type and number of the interaction prop added into the live stream in the interaction instruction; and when the type of the interaction prop is a preset type and/or the number of the interaction prop is larger than a preset threshold, the interaction platform adds the identifier of the client which sends the interaction prop into the live stream. For example, the interaction platform acquires the type "rose" and number 1 of the interaction prop in the interaction instruction. The interaction platform may preset an addition condition, and the interaction platform adds the identifier of the client which sends the interaction prop into the live stream when the addition condition is met, where the addition condition may be that the type of the interaction prop is the preset type and/or the number of the interaction prop is larger than the preset threshold. When the addition condition is met, the interaction platform adds the identifier of the client which sends the interaction prop into the live stream on the basis of adding the interaction prop into the live stream; and when the addition condition is not met, the interaction platform only adds the interaction prop into the live stream.

As shown in FIG. 4C, the addition condition preset by the interaction platform is that the type of the interaction prop is "rose" or the number of the interaction props is larger than 5. Since the type of the interaction prop indicated by the interaction instruction sent to the interaction platform by the client is "rose", the addition condition is met, and the interaction platform adds the identifier 45 corresponding to the client into the live stream.

It is to be noted that there is no strict sequential relationship between Step 709 and Step 714, that is, after the interaction platform receives the interaction instruction from the client, Step 709 and Step 714 may be executed at the same time, or, Step 709 may be executed first and then Step 714 may be executed.

Step 715: the interaction platform sends the live stream added with the interaction prop to at least one client.

In order to enable all users watching the live program to watch the live stream added with the interaction prop, the interaction platform sends the live stream added with the interaction prop to all clients receiving the live stream.

It is to be noted that since the live stream may reach the client after a delay for some causes, the interaction platform preferably sends the instant feedback information to the client to enable the user to timely learn about that the interaction instruction is successfully sent and then send the live stream added with the interaction prop to the client.

Step 716: the client receives and displays the live stream added with the interaction prop from the interaction platform.

Correspondingly, the client may receive and display the instant feedback information from the interaction platform at first, and after a certain time delay, the client may receive the live stream added with the interaction prop, and decodes and plays the live stream.

As shown in FIG. 4C, the client receives and displays the live stream added with the interaction prop.

In view of the above, according to the information sending method provided by the embodiment, after the interaction platform receives the interaction instruction, the image frame is intercepted from the current live stream, the instant feedback information is generated according to the image frame and the interaction prop indicated by the interaction instruction, the instant feedback information is sent to the client which sends the interaction instruction, and the client receives and displays the instant feedback information, so that the problem of cannot timely feeding back whether the interaction instruction is successfully sent or not to the user due to a delay of arrival of the live stream at the client is solved; and since the instant feedback information is not required to be sent to the client together with the live stream added with the interaction prop, and the instant feedback information may reach the client earlier than the live stream added with the interaction prop, so that the user may timely learn about that the interaction instruction has been successfully sent according to the instant feedback information returned by the interaction platform, and furthermore, the technical effect of avoiding interaction prop waste caused by the user's repeated sending of the interaction instruction may be achieved.

In the embodiment, the client further provides the sharing entry corresponding to the instant feedback information for the user, so that the user may conveniently and timely share the instant feedback information to a friend, thus improving interaction experiences of the user, and implementing secondary propagation of the instant feedback information.

In the embodiment, the interaction platform further adds the identifier corresponding to the client which sends the interaction instruction into the live stream according to the type and/or number of the interaction prop in the interaction instruction sent by the client when the type and/or number of the interaction prop meet/meets (a) preset condition(s), so that the interaction experiences of the user are improved, and the user may know that the interaction instruction has been successfully sent more intuitively.

Device embodiments of the present disclosure are described below, and details not described in the device embodiments may refer to the corresponding method embodiments.

Figure 8:
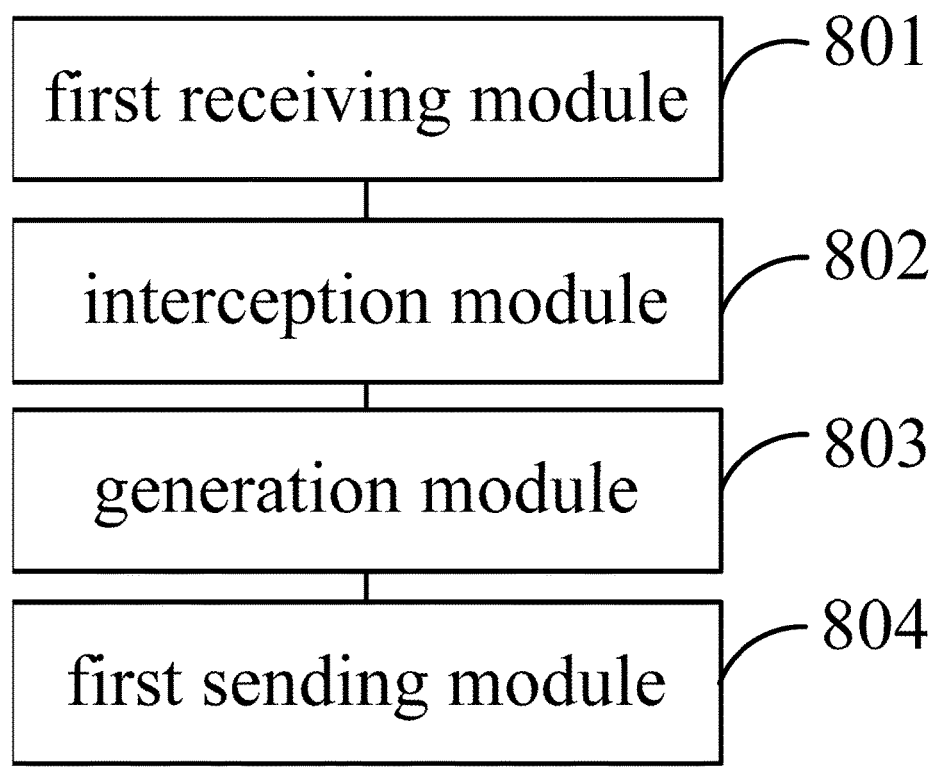
FIG. 8 is a structure block diagram of an interaction platform, according to an embodiment of the present disclosure.

FIG. 8 is a structure block diagram of an interaction platform, according to an embodiment of the present disclosure. The interaction platform includes an information sending device. The information sending device is implemented as all or part of the interaction platform 140 in FIG. 1 by virtue of software, hardware or a combination of the two. The information sending device includes: a first receiving module 801, an interception module 802, a generation module 803 and a first sending module 804.

The first receiving module 801 is configured to receive, from a client, an interaction instruction for instructing an interaction platform to add an interaction prop into a live stream.

The interception module 802 is configured to, after the interaction instruction is received, intercept an image frame from a current live stream.

The generation module 803 is configured to generate instant feedback information according to the image frame and the interaction prop indicated by the interaction instruction.

The first sending module 804 is configured to send the instant feedback information to the client which sends the interaction instruction.

In view of the above, according to the information sending device provided by the embodiment, after the interaction platform receives the interaction instruction, the image frame is intercepted from the current live stream, the instant feedback information is generated according to the image frame and the interaction prop indicated by the interaction instruction, the instant feedback information is sent to the client which sends the interaction instruction, and the client receives and displays the instant feedback information, so that the problem of cannot timely feeding back whether the interaction instruction is successfully sent or not to a user due to a delay of arrival of the live stream at the client is solved; and since the instant feedback information is not required to be sent to the client together with the live stream added with the interaction prop, and the instant feedback information may reach the client earlier than the live stream added with the interaction prop, so that the user may timely learn about that the interaction instruction has been successfully sent according to the instant feedback information returned by the interaction platform, and furthermore, the technical effect of avoiding interaction prop waste caused by the user's repeated sending of the interaction instruction may be achieved.

Figure 9:
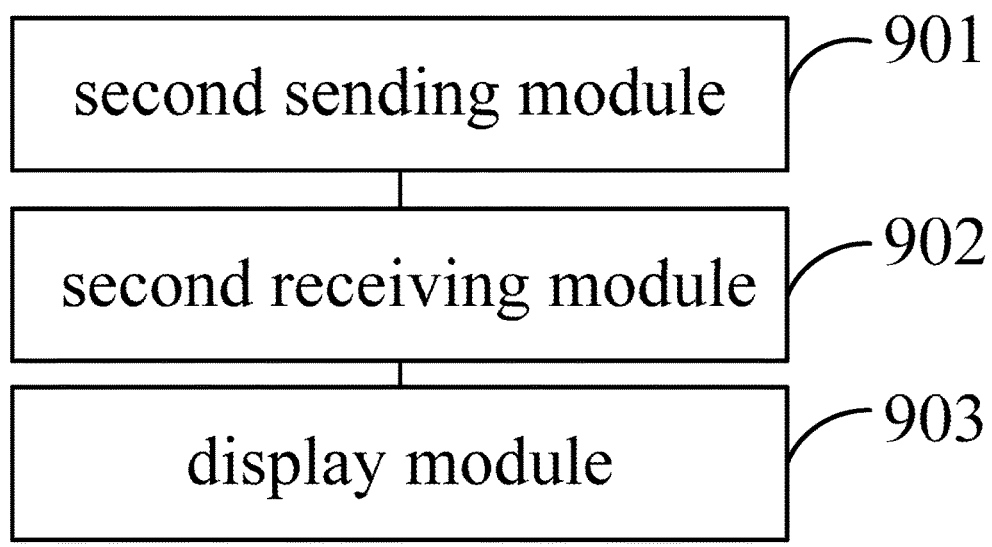
FIG. 9 is a structure block diagram of a terminal, according to an embodiment of the present disclosure.

FIG. 9 is a structure block diagram of a terminal, according to an embodiment of the present disclosure. The terminal includes an information receiving device, which is implemented as all or part of the terminal 120 in FIG. 1 by virtue of software, hardware or a combination of the two. The information receiving device includes: a second sending module 901, a second receiving module 902 and a display module 903.

The second sending module 901 is configured to send to an interaction platform an interaction instruction for instructing the interaction platform to add an interaction prop into a live stream.

The second receiving module 902 is configured to receive instant feedback information from the interaction platform. The instant feedback information may be generated according to an image frame intercepted from a current live stream after the interaction platform receives the interaction instruction and the interaction prop indicated by the interaction instruction.

The display module 903 is configured to display the instant feedback information.

In view of the above, according to the information receiving device provided by the embodiment, after the interaction platform receives the interaction instruction, the image frame is intercepted from the current live stream, the instant feedback information is generated according to the image frame and the interaction prop indicated by the interaction instruction, the instant feedback information is sent to the client which sends the interaction instruction, and the client receives and displays the instant feedback information, so that the problem of cannot timely feeding back whether the interaction instruction is successfully sent or not to a user due to a delay of arrival of the live stream at the client is solved; and since the instant feedback information is not required to be sent to the client together with the live stream added with the interaction prop, and the instant feedback information may reach the client earlier than the live stream added with the interaction prop, so that the user may timely learn about that the interaction instruction has been successfully sent according to the instant feedback information returned by the interaction platform, and furthermore, the technical effect of avoiding interaction prop waste caused by the user's repeated sending of the interaction instruction may be achieved.

Figure 10:
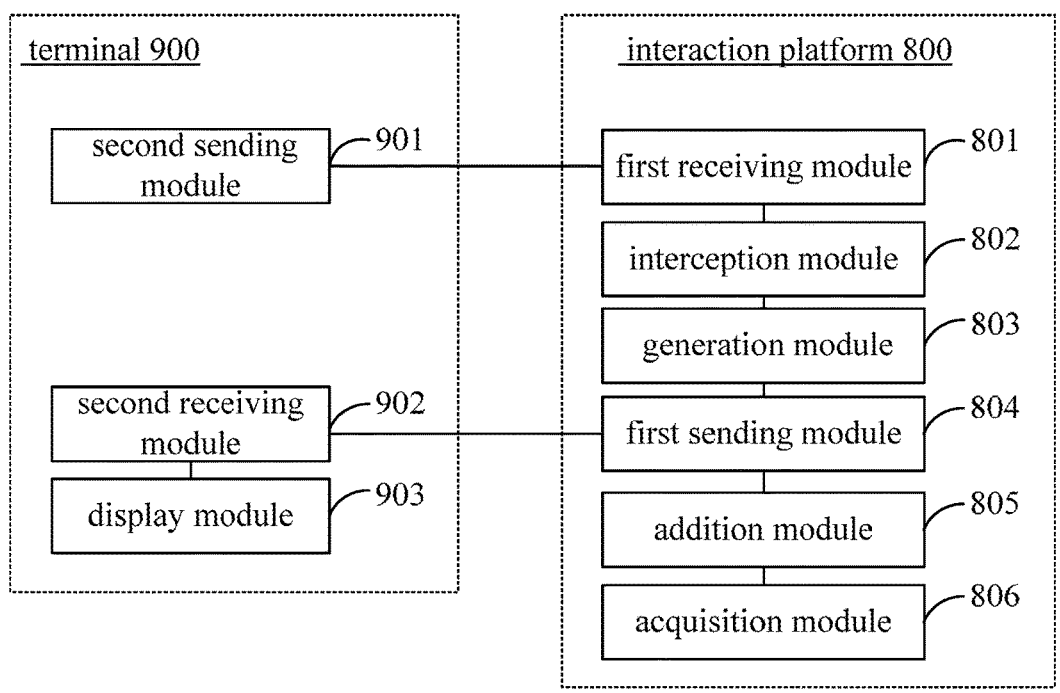
FIG. 10 is a structure diagram of a live interaction system, according to an embodiment of the present disclosure.

FIG. 10 is a structure diagram of a live interaction system, according to an embodiment of the present disclosure. The live interaction system includes: an interaction platform 800 and at least one terminal 900.

The interaction platform 800 includes: a first receiving module 801, an interception module 802, a generation module 803 and a first sending module 804.

The first receiving module 801 is configured to receive, from a client, an interaction instruction for instructing an interaction platform to add an interaction prop into a live stream.

The interception module 802 is configured to, after the interaction instruction is received, intercept an image frame from a current live stream.

The generation module 803 is configured to generate instant feedback information according to the image frame and the interaction prop indicated by the interaction instruction.

The first sending module 804 is configured to send the instant feedback information to the client which sends the interaction instruction.

Optionally, the generation module 803 is specifically configured to: select an interaction template corresponding to the interaction prop from an interaction template library according to the interaction prop indicated by the interaction instruction, where the interaction template library includes at least one interaction template corresponding to the interaction prop; and synthesize the image frame and the interaction template into an interaction picture, the instant feedback information including at least the interaction picture.

Optionally, the interaction platform 800 further includes: an addition module 805.

The addition module 805 is configured to add the interaction prop indicated by the interaction instruction into the live stream.

The first sending module 804 is further configured to send the live stream added with the interaction prop to at least one client.

Optionally, the interaction platform 800 further includes an acquisition module 806.

The acquisition module 806 is configured to acquire a type and number of the interaction prop added into the live stream in the interaction instruction.

The addition module 805 is configured to, when the type of the interaction prop is a preset type and/or the number of the interaction prop is larger than a preset threshold, add an identifier of the client which sends the interaction prop into the live stream.

The terminal 900 includes: a second sending module 901, a second receiving module 902 and a display module 903.

The second sending module 901 is configured to send to the interaction platform the interaction instruction for instructing the interaction platform to add the interaction prop into the live stream.

The second receiving module 902 is configured to receive the instant feedback information from the interaction platform. The instant feedback information is generated according to the image frame intercepted from the current live stream after the interaction platform receives the interaction instruction and the interaction prop indicated by the interaction instruction.

The display module 903 is configured to display the instant feedback information.

Optionally, the second receiving module 902 is further configured to receive the live stream added with the interaction prop from the interaction platform. The display module 903 is further configured to display the live stream.

Optionally, the display module 903 is further configured to display a sharing entry corresponding to the instant feedback information. The second sending module 901 is further configured to send a sharing request to a third-party server through the sharing entry.

The sharing request is configured to request the third-party server to send the instant feedback information to at least one client which has a friendship with the client in an instant message. Alternatively, the sharing request is configured to request the third-party server to send the instant feedback information to at least one client in a same group with the client in a group message. Alternatively, the sharing request is configured to request the third-party server to display the instant feedback information in a social information sharing platform of the client, here, information in the social information sharing platform of the client can be viewed by a client which has a social relationship with the client and has an access to the social information sharing platform. Alternatively, the sharing request is configured to request the third-party server to display the instant feedback information in a microblog information sharing platform of the client, here, information in the microblog information sharing platform of the client can be viewed by a client which has a social relationship with the client and has an access to the microblog information sharing platform.

In view of the above, according to the live interaction system provided by the embodiment, after the interaction platform receives the interaction instruction, the image frame is intercepted from the current live stream, the instant feedback information is generated according to the image frame and the interaction prop indicated by the interaction instruction, the instant feedback information is sent to the client which sends the interaction instruction, and the client receives and displays the instant feedback information, so that the problem of cannot timely feeding back whether the interaction instruction is successfully sent or not to a user due to a delay of arrival of the live stream at the client is solved; and since the instant feedback information is not required to be sent to the client together with the live stream added with the interaction prop, and the instant feedback information may reach the client earlier than the live stream added with the interaction prop, so that the user may timely learn about that the interaction instruction has been successfully sent according to the instant feedback information returned by the interaction platform, and furthermore, the technical effect of avoiding interaction prop waste caused by the user's repeated sending of the interaction instruction may be achieved.

In the embodiment, the client further provides the sharing entry corresponding to the instant feedback information for the user, so that the user may conveniently and timely share the instant feedback information to a friend, thus improving interaction experiences of the user, and implementing secondary propagation of the instant feedback information.

In the embodiment, the interaction platform further adds the identifier corresponding to the client which sends the interaction instruction into the live stream according to the type and/or number of the interaction prop in the interaction instruction sent by the client when the type and/or number of the interaction prop meet/meets (a) preset condition(s), so that the interaction experiences of the user are improved, and the user may know that the interaction instruction has been successfully sent more intuitively.

It is to be noted that: the information sending device and information receiving device provided by the embodiment are described only with division of each of the abovementioned functional modules as an example, and during practical application, the abovementioned functions may be allocated to different functional modules for implementation as required; that is, an internal structure of the interaction platform or the terminal is divided into different functional modules to implement all or part of the abovementioned functions. In addition, the information sending device provided by the embodiment adopts the same inventive concept with the information sending method, the information receiving device adopts the same inventive concept with the information receiving method, and details about their specific implementation processes refer to the method embodiments, and will not be elaborated herein.

In an exemplary embodiment, there is also provided a non-transitory computer-readable storage medium including instructions, for example, a memory including instructions, and the instructions may be executed by a processor of a terminal to implement each step at a client side in the method embodiment, or the instructions are executed by a processor of a server to implement each step at an interaction platform side in the method embodiment. For example, the non-transitory computer-readable storage medium may be a ROM, a RAM, a CD-ROM, a storage tape, a floppy disk, optical data storage device and the like.

It is to be understood that a singular form ("a", "an" and "the") used in the present disclosure is also intended to include a plural form, unless an exceptional case is clearly supported in the context. It is also to be understood that "and/or" used in the present disclosure refers to any and all possible combinations of one or more than one associated item which is listed.

Serial numbers of the embodiments of the present disclosure are only adopted for description, and are not intended to represent merits of the embodiments.

Those skilled in the art should know that all or part of the steps of the embodiments may be implemented by hardware, and may also be implemented by related hardware instructed by a program, the program may be stored in a computer-readable storage medium, and the abovementioned storage medium may be a ROM, a magnetic disk, a compact disc or the like.

The above is only the preferred embodiment of the present disclosure and not intended to limit the present disclosure, and any modification, equivalent replacement, improvement and the like made within the spirit and principle of the present disclosure shall fall within the scope of protection of the present disclosure.

The invention claimed is:

1. An information sending method, applied in an interaction platform installed in a server, the method comprising:
receiving from a first client of at least one client, an interaction instruction for instructing the interaction platform to add an interaction prop into a live stream;
intercepting an image frame from the current live stream, after receiving the interaction instruction;
generating instant feedback information according to the image frame and the interaction prop indicated by the interaction instruction; and
sending the instant feedback information to the first client which sends the interaction instruction;
receiving a prop acquisition instruction from the first client, the prop acquisition instruction containing a type and number of the interaction prop;
transferring a number of resources corresponding to the type and number of the interaction prop from an account corresponding to the first client to an account corresponding to the interaction platform, after receiving the prop acquisition instruction;
detecting whether the number of the resources transferred from the account corresponding to the first client is consistent with the type and number of the interaction prop in the prop acquisition request, and if yes, adding the corresponding type and number of interaction prop into an interaction prop library corresponding to the first client and
sending an exchange success indication to the first client, the exchange success indication containing the type and number of the interaction prop.

2. The method according to claim 1, wherein generating the instant feedback information according to the image frame and the interaction prop indicated by the interaction instruction comprises:

selecting an interaction template corresponding to the interaction prop from an interaction template library according to the interaction prop indicated by the interaction instruction, wherein the interaction template library contains interaction templates corresponding to at least one interaction prop; and
synthesizing the image frame and the interaction template into an interaction picture, the instant feedback information comprising at least the interaction picture.

3. The method according to claim 1, wherein after receiving the interaction instruction from the first client, the method further comprises:
adding the interaction prop indicated by the interaction instruction into the live stream; and
sending the live stream added with the interaction prop to the at least one client.

4. The method according to claim 1, wherein after receiving the interaction instruction from the first client, the method further comprises:
acquiring a type and number of the interaction prop added into the live stream in the interaction instruction; and
adding an identifier of the first client which sends the interaction prop into the live stream, when at least one of the following conditions is met:
the type of the interaction prop is a preset type; and
the number of the interaction prop is larger than a preset threshold.

5. An information receiving method, applied in a first client installed in a terminal, the method comprising:
sending to an interaction platform an interaction instruction for instructing the interaction platform to add an interaction prop into a live stream;
receiving instant feedback information from the interaction platform, wherein the instant feedback information is generated according to an image frame intercepted from the current live stream by the interaction platform after receiving the interaction instruction and the interaction prop indicated by the interaction instruction; and
displaying the instant feedback information;
wherein before sending the interaction instruction, the method further comprises:
sending a prop acquisition instruction to an interaction platform, the prop acquisition instruction containing a type and number of an interaction prop;
transferring a number of resources corresponding to the type and number of the interaction prop from an account corresponding to the first client to an account corresponding to the interaction platform;
receiving the exchange success indication from the interaction platform; and
updating the number of the interaction prop in an interaction prop library corresponding to the first client.

6. The method according to claim 5, wherein after sending the interaction instruction to the interaction platform, the method further comprises:
receiving the live stream added with the interaction prop from the interaction platform; and
displaying the live stream.

7. The method according to claim 5, wherein after receiving the instant feedback information from the interaction platform, the method further comprises:
displaying a sharing entry corresponding to the instant feedback information; and
sending a sharing request to a third-party server through the sharing entry,
wherein the sharing request is configured to request the third-party server to send the instant feedback information to at least one client which has a friendship with the first client in an instant message; or, the sharing request is configured to request the third-party server to send the instant feedback information to the first client and at least one client in a same group with the first client in a group message; or, the sharing request is configured to request the third-party server to display the instant feedback information in a social information sharing platform of the first client, wherein information in the social information sharing platform of the first client can be viewed by another client which has a social relationship with the first client and has an access to the social information sharing platform; or, the sharing request is configured to request the third-party server to display the instant feedback information in a microblog information sharing platform of the first client, wherein information in the microblog information sharing platform of the first client can be viewed by another client which has a social relationship with the first client and has an access to the microblog information sharing platform.

8. The method according to claim 5, wherein after sending the interaction instruction, the method further comprises:
   playing an animation simulating user actions associated with the interaction prop.

9. A server, comprising:
   one or more processors; and
   a memory,
   wherein the memory stores one or more programs configured to be executed by the one or more processors, and the one or more programs comprise instructions for executing the following operations:
   receiving, from a first client of at least one client, an interaction instruction for instructing the interaction platform to add an interaction prop into a live stream;
   intercepting an image frame from the current live stream, after receiving the interaction instruction;
   generating instant feedback information according to the image frame and the interaction prop indicated by the interaction instruction; and
   sending the instant feedback information to the first client which sends the interaction instruction;
   wherein the one or more programs further comprise instructions for executing the following operations:
   receiving a prop acquisition instruction from the first client, the prop acquisition instruction containing a type and number of the interaction prop;
   transferring a number of resources corresponding to the type and number of the interaction prop from an account corresponding to the first client to an account corresponding to the interaction platform, after receiving the prop acquisition instruction;
   detecting whether the number of the resources transferred from the account corresponding to the first client is consistent with the type and number of the interaction prop in the prop acquisition request, and if yes, adding the corresponding type and number of interaction prop into an interaction prop library corresponding to the first client; and
   sending an exchange success indication to the first client, the exchange success indication containing the type and number of the interaction prop.

10. The server according to claim 9, wherein the one or more programs further comprise instructions for executing the following operations:
   selecting an interaction template corresponding to the interaction prop from an interaction template library according to the interaction prop indicated by the interaction instruction, wherein the interaction template library contains interaction templates corresponding to at least one interaction prop; and
   synthesizing the image frame and the interaction template into an interaction picture, the instant feedback information comprising at least the interaction picture.

11. The server according to claim 9, wherein the one or more programs further comprise instructions for executing the following operations:
   adding the interaction prop indicated by the interaction instruction into the live stream; and
   sending the live stream added with the interaction prop to the at least one client.

12. The server according to claim 9, wherein the one or more programs further comprise instructions for executing the following operations:
   acquiring a type and number of the interaction prop added into the live stream in the interaction instruction; and
   adding an identifier of the first client which sends the interaction prop into the live stream, when at least one of the following conditions is met:
   the type of the interaction prop is a preset type; and the number of the interaction prop is larger than a preset threshold.

13. A terminal, comprising:
   one or more processors; and
   a memory;
   wherein the memory stores one or more programs configured to be executed by the one or more processors, and the one or more programs comprise instructions for executing the following operations:
   sending, to an interaction platform, an interaction instruction for instructing the interaction platform to add an interaction prop into a live stream;
   receiving instant feedback information from the interaction platform, wherein the instant feedback information is generated according to an image frame intercepted from the current live stream by the interaction platform after receiving the interaction instruction and the interaction prop indicated by the interaction instruction; and
   displaying the instant feedback information;
   wherein the one or more programs further comprise instructions for executing the following operations:
   before the interaction instruction,
   sending a prop acquisition instruction to an interaction platform, the prop acquisition instruction containing a type and number of an interaction prop;
   transferring a number of resources corresponding to the type and number of the interaction prop from an account corresponding to the first client to an account corresponding to the interaction platform;
   receiving the exchange success indication from the interaction platform; and
   updating the number of the interaction prop in an interaction prop library corresponding to the first client.

14. The terminal according to claim 13, wherein the one or more programs further comprise instructions for executing the following operations:
   receiving the live stream added with the interaction prop from the interaction platform; and
   displaying the live stream.

15. The terminal according to claim 13, wherein the one or more programs further comprise instructions for executing the following operations:
   displaying a sharing entry corresponding to the instant feedback information; and sending a sharing request to a third-party server through the sharing entry, wherein the sharing request is configured to request the third-party server to send the instant feedback information to at least one client which has a friendship with the first client in an instant message; or, the sharing request is configured to request the third-party server to send the instant feedback information to the first client and at least one client in a same group with the first client in a group message; or, the sharing request is configured to request the third-party server to display the instant feedback information in a social information sharing platform of the first client, wherein information in the social information sharing platform of the first client can be viewed by another client which has a social relationship with the first client and has an access to the social information sharing platform; or, the sharing request is configured to request the third-party server to display the instant feedback information in a microblog information sharing platform of the first client, wherein information in the microblog information sharing platform of the first client can be viewed by another client which has a social relationship with the first client and has an access to the microblog information sharing platform.

16. The terminal according to claim 13, wherein the one or more programs further comprise instructions for executing the following operations:

after sending the interaction instruction, playing an animation simulating user actions associated with the interaction prop.

\* \* \* \* \*